United States Patent [19]

Von Grünberg et al.

[11] Patent Number: 4,491,340
[45] Date of Patent: Jan. 1, 1985

[54] VEHICLE WHEEL AXLE AND BRAKE MOUNTING ASSEMBLY

[75] Inventors: Hubertus Von Grünberg, Kronberg-Schoenberg, Fed. Rep. of Germany; Frederick Corey, Dearborn; Jonathan M. Rowell, Birmingham, both of Mich.

[73] Assignee: ITT Industries, Inc., New York, N.Y.

[21] Appl. No.: 449,354

[22] Filed: Dec. 13, 1982

[51] Int. Cl.³ .............................................. B60B 3/00
[52] U.S. Cl. ................................ 280/668; 188/73.43; 301/124 R
[58] Field of Search .......... 301/6 R, 6 E, 123, 124 R, 301/125; 188/73.43; 280/668

[56] References Cited

U.S. PATENT DOCUMENTS 4,155,601  5/1979  Ito ........................................ 301/6 E

FOREIGN PATENT DOCUMENTS 2006356  5/1979  United Kingdom ............. 188/73.43

*Primary Examiner*—David A. Scherbel
*Attorney, Agent, or Firm*—James B. Raden; Edward J. Brosius

[57] ABSTRACT

An arrangement for mounting a wheel axle and associated disc brake on a strut, particularly for use at the steerable front wheels of a motor vehicle with a front wheel drive, includes a first and a second component which are separatably connected to one another in the assembled condition of the mounting arrangement. The first component is secured to the strut and has a cup-shaped configuration. The second component has a central sleeve-shaped portion which abounds a passage in which the wheel axle is supported by a bearing interposed between the wheel axle and the sleeve-shaped portion. The second component also has two support arms which brake shoes of the disc brake are guided for movement toward and away from a disc rotor which rotates with the wheel axle. Two elongated guiding elements are secured to the second component, and a brake caliper is guided thereon for movement parallel to the axial direction of the wheel axle. The caliper carries a cylinder-and-piston unit of the disc brake, which includes a piston that directly acts on the brake shoe close to it, and a cylinder which transmits a reaction force via a bridge portion of the caliper to the other brake shoe. The second component further has an attachment arm to which a steering link can be connected. The first component has a cup-shaped configuration, thus bounding a recess in which a shaft seal surrounding the wheel axle is protectedly received, and in which a bearing socket for a suspension link is secured.

20 Claims, 5 Drawing Figures

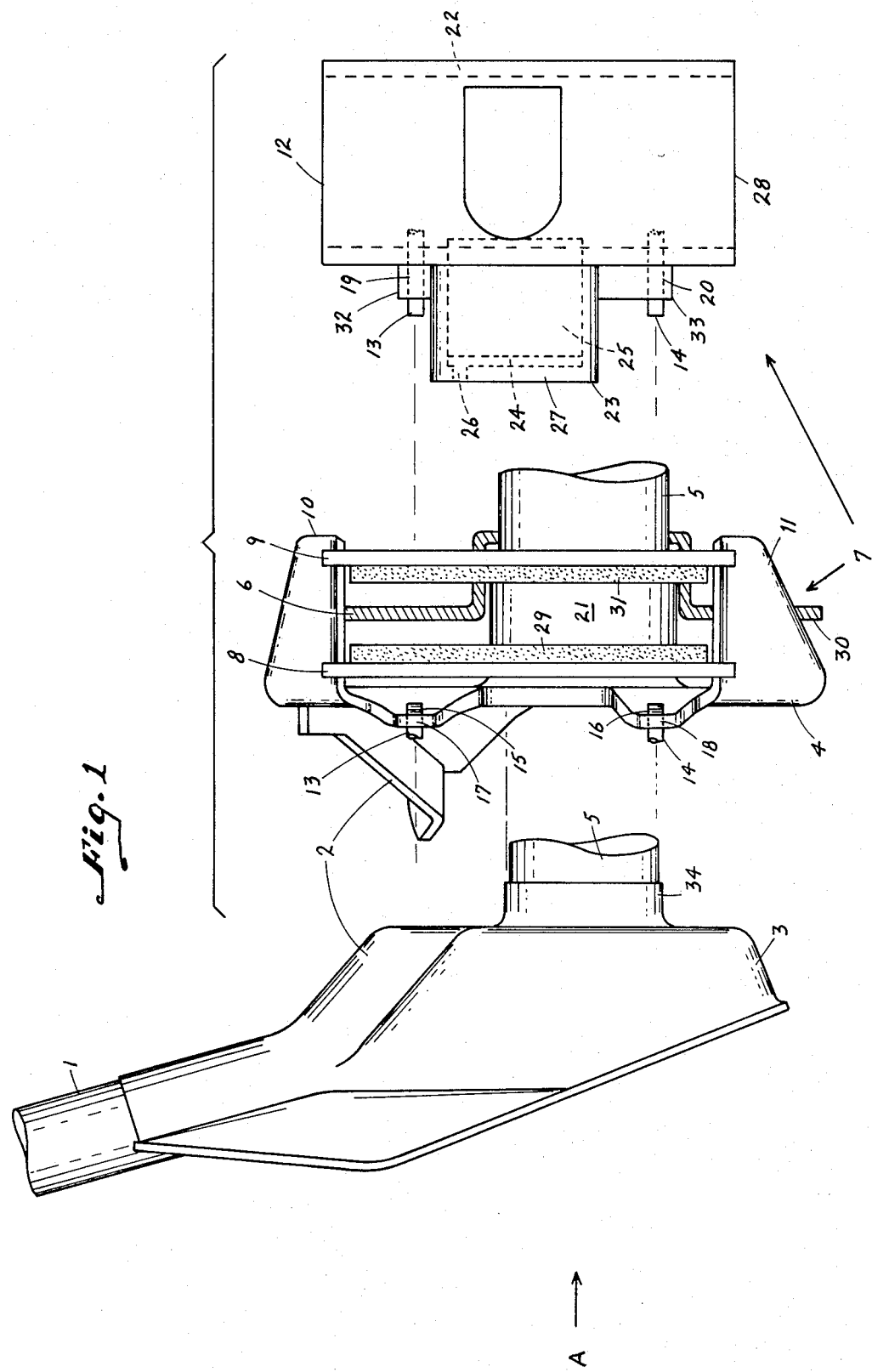

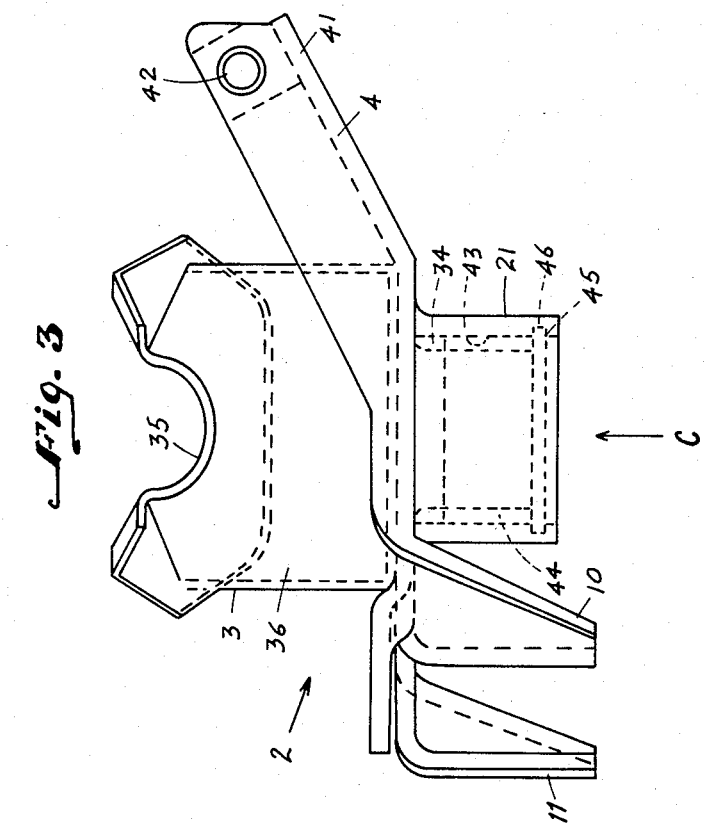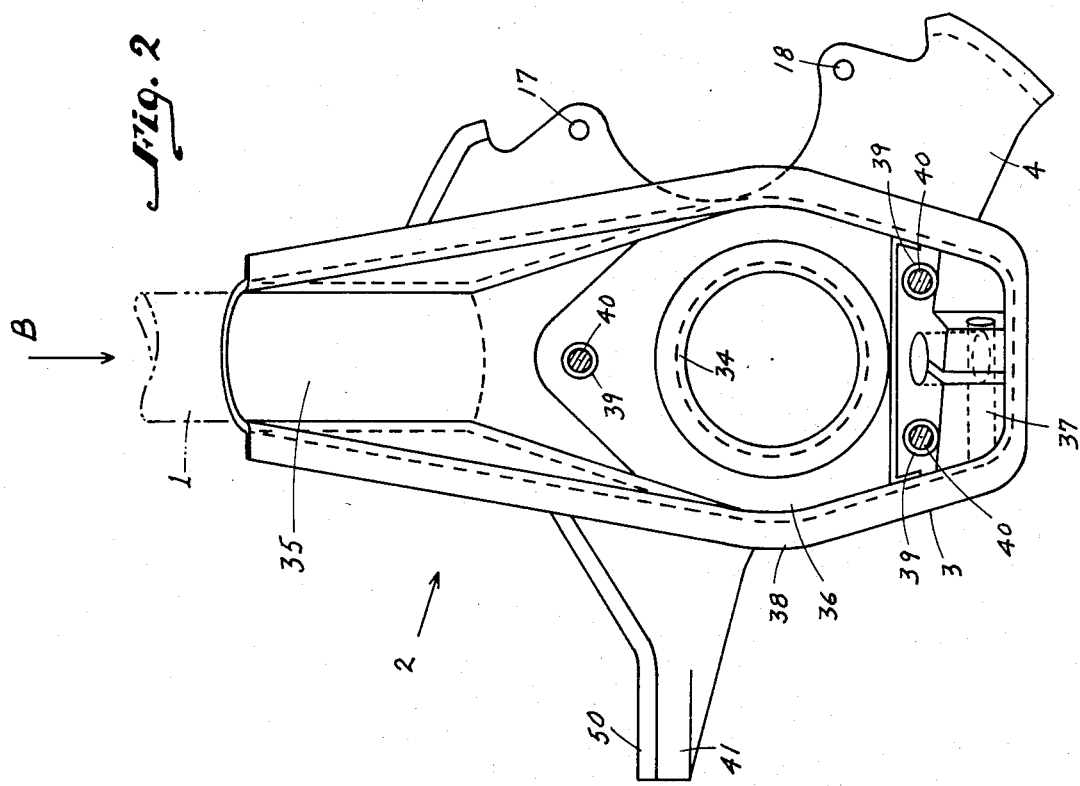

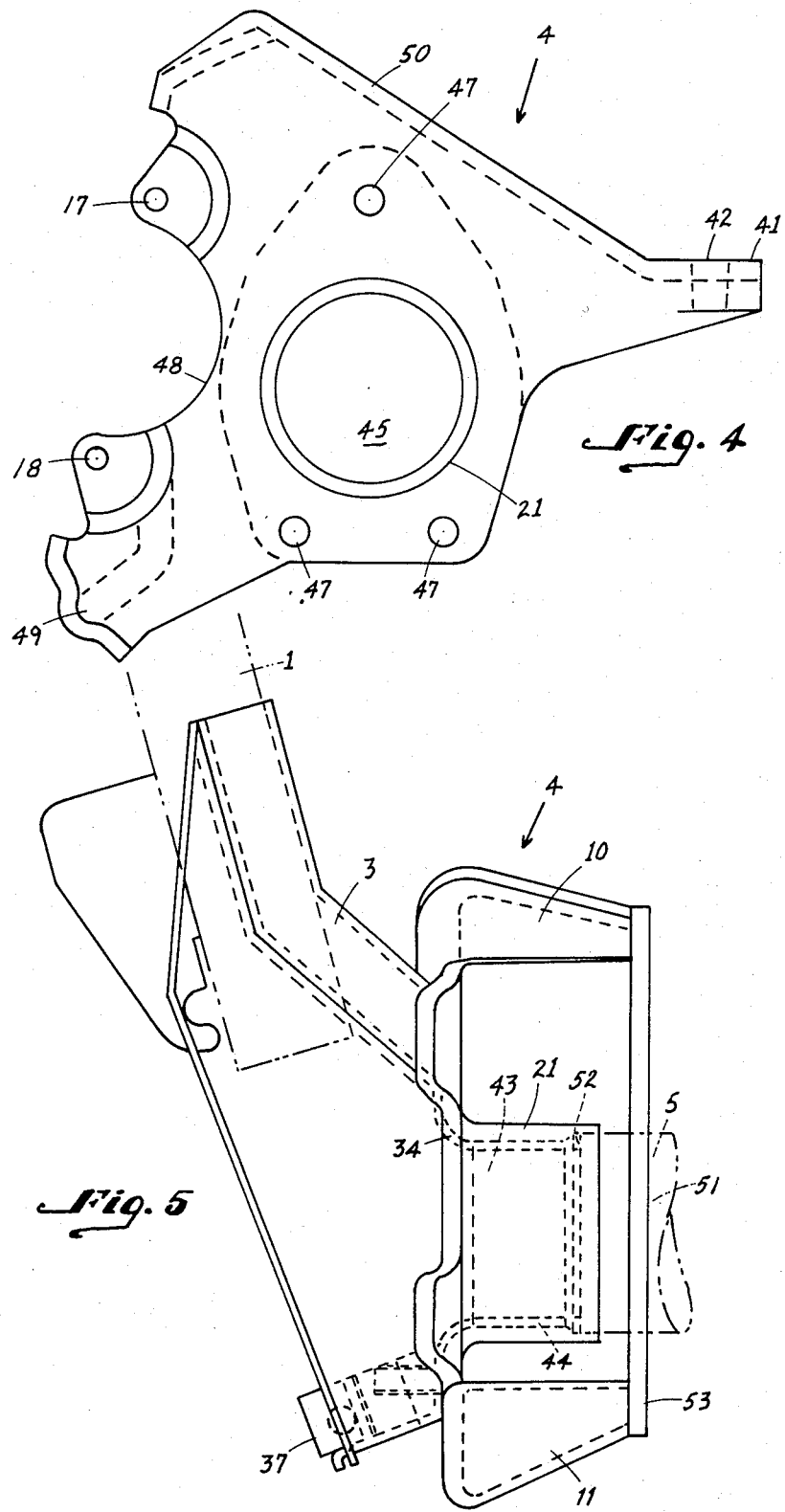

VEHICLE WHEEL AXLE AND BRAKE MOUNTING ASSEMBLY

BACKGROUND OF THE INVENTION

The present invention relates to vehicle wheel axle and brake mounting assemblies in general, and more particularly to an assembly of this type which is especially suited for mounting the axle of a steerable front wheel of a motor vehicle and the associated disc brake.

A great number of wheel axle mounting arrangements for use on motor vehicles is already known. With increasing popularity of front wheel drive, mounting arrangements for front wheel axles employing MacPherson struts are gaining in prominence. In such mounting arrangements, the MacPherson strut performs several functions: it serves as a support for a wheel axle and associated disc brake supporting arrangement, as a pivot about which the supporting arrangement turns during the steering of the respective wheel and, more often than not, as a shock absorber. To be able to perform these functions, the MacPherson strut must satisfy many requirements which are often contradictory to one another. Therefore, conventional mounting arrangements of this type are usually rather massive and, in most instances, constructed as integral units which must be replaced in their entirety, at a rather high expense, upon failure to perform any of the above functions, such as the shock-absorbing function. Moreover, since the mounting arrangements for the left and right wheels of the vehicle are not identical but rather are mirror images of one another, it was necessary to maintain a sufficient stock of both right-wheel and left-wheel mounting arrangements to meet any contingencies or demands. The resulting need for a substantial amount of additional storage space further contributes to the already high cost of such unitary mounting arrangements. A further drawback of the known mounting arrangements of this type is that they are designed to support complete disc brake units, which adds additional mass to the already considerable mass of the mounting arrangement itself. Also, the conventional unitary mounting arrangements are suitable for use only on the front wheels of the vehicle, and differently constructed mounting arrangements have to be used for supporting the rear wheels of the vehicle.

The disadvantages of the conventional mounting arrangements of the above type have already been recognized and attempts been made to overcome or at least alleviate at least some of the above-discussed problems. So, for instance, a mounting arrangement incorporated in the Fiat Panda passenger car utilizes a cup-shaped mounting member which is secured to the MacPherson strut at the lower end of the latter and which carries the bearing for the wheel axle. Then, an anchor or carrier member of a disc brake associated with the respective wheel is mounted on this cup-shaped mounting member. However, even this arrangement, as advantageous as it may be in some respects still is rather expensive and massive.

SUMMARY OF THE INVENTION

Accordingly, it is a general object of the present invention to avoid the disadvantages of the prior art.

More particularly, it is an object of the present invention to provide a mounting assembly for mounting a vehicle wheel axle and a spot-type disc brake, which arrangement does not possess the disadvantages of the conventional arrangements of this type.

Still another object of the present invention is so to construct the arrangement as to reduce the overall weight thereof, without sacrificing or impairing the structural strength and other properties of the arrangement.

It is yet another object of the present invention to so design the mounting arrangement of the type here under consideration as to significantly reduce the number of parts which have to be kept in stock for replacement purposes.

A concomitant object of the present invention is to develop a mounting arrangement of the above type which is simple in construction, inexpensive to manufacture, easy to install, and reliable in operation nevertheless.

In pursuance of these objects and others which will become apparent hereafter, one feature of the present invention resides in an arrangement for mounting on a supporting strut a rotatable vehicle wheel axle and a disc brake assembly including a pair of brake shoes one arranged at one and the other at the other axial side of a brake rotor which is jointly rotatable with the wheel axle, a brake caliper spanning the brake rotor, and an actuating unit connected to the brake caliper at the one axial side and acting directly on the one and through the brake caliper on the other brake shoe, this arrangement comprising a first component of a substantially cup-shaped configuration connected to the strut and having a through opening for the passage of the wheel axle therethrough and an axially facing outer surface surrounding the through opening; and a second component having a contact surface and so connected to the first component that the contact surface contacts the outer surface, this second component including a sleeve shaped portion extending away from the first component and bounding a passage aligned with the through opening for accommodating the wheel axle, at least one bearing received in the passage and supporting the wheel axle therein, a pair of brake shoe supporting arms extending away from the first component outwardly spaced from the sleeve-shaped portion and circumferentially spaced from one another and having respective guiding surfaces for the brake shoes extending substantially parallel to the passage, and a pair of caliper-mounting portions spaced outwardly from the sleeve-shaped portion and circumferentially from one another for mounting the brake caliper thereon for movement substantially parallel to the wheel axle. Advantageously, at least one, but preferably each, of the components is a sheet metal pressing, that is, an element obtained from a metal sheet by applying pressure thereto, such as in a stamping press.

A particular advantage of the construction described so far is that the second component of the mounting arrangement, despite being relatively light-weight due to its manufacture from sheet metal, is fully equipped to perform not only the functions customarily performed by the conventional mounting arrangements, but also the functions of supporting and guiding the brake shoes and the caliper of the disc brake arrangement. This considerably reduces the total weight of the assembly consisting of the mounting arrangement and the associated disc brake. Moreover, since the shape of the first component can be chosen almost at will, it is possible and proposed by the present invention to give the first component such a shape as to be usable both at the left-wheel and right-wheel axles. This is particularly advantageous when, in accordance with another aspect of the present invention, the first component has a zone bounding a channel for sealing a portion of the strut, and when welded connection means is used for connecting the first component to the strut at the aforementioned zone to form a unit with the strut. The use of the universal, that is, both right and left hand, first component according to the present invention then means that only one type of such unit will have to be kept in stock, for use either on the right-hand side or on the left-hand side of the respective vehicle, as the need may arise. The strut may be a MacPherson strut of the type customarily used to support the front wheel, or a different strut forming a part of the suspension for a rear wheel of the vehicle. Hence, the first and second components of the arrangement of the present invention can be used either at the front wheels or at the rear wheels of the vehicle.

It is especially advantageous, in accordance with another aspect of the present invention which is to be used on the mounting arrangements to be used for mounting the steerable front wheels of a vehicle, when the second component further includes an attachment portion for attachment of a steering arm thereto. This expedient further simplifies the manufacture of the assembly of the mounting arrangement with the MacPherson strut for use on the steerable front wheels of a vehicle, inasmuch as no separate provision needs to be made any longer for the connection of the steering arm to the strut. Rather, the attachment portion is simply manufactured during the pressing or stamping procedure during which the second component is being manufactured.

The mounting arrangement described so far forms a part of a brakable wheel axle arrangement, which additionally includes the supporting strut, the wheel axle, the brake rotor, the brake shoes and the brake caliper. In this arrangement, the caliper-mounting portions, which are advantageously constructed as elongated guiding elements having threaded portions threaded into corresponding bores of the second component, achieve mounting of the caliper directly on the second component, so that the otherwise existing need for providing a carrier plate or anchor for mounting of the caliper thereon is overcome. Consequently, the relatively inexpensive and easily manufacturable second component serves a variety of purposes, whereas the first component and, for that matter, the strut itself, can be constructed in a relatively simple manner. This is attributable to the fact that neither the strut nor the first component need be constructed for performing any of the functions that are performed by the second component. However, the first component, because of its cup-shaped configuration, also serves to protect a shaft seal provided on the wheel axle from damage, and is a support for a ball bearing for a tie rod of the wheel axle suspension.

The brake shoe supporting arms extend away from the first component in a cantilever fashion. This may not be detrimental in many applications. However, in heavy-duty applications, it could occur that the extent of bending of the respective supporting arm by the forces transmitted thereto from the respective brake shoe during the braking operation could be excessive. Under such circumstances, it is advantageous when, in accordance with further facet of the present invention, a reinforcing element is provided which extends between and is rigidly connected to the supporting arms, preferably at the free ends of the latter. Such reinforcing element will then transmit at least a part of the forces acting on one of the supporting arms to the other supporting arm, thus significantly reducing the extent of bending of the first-mentioned support arm.

BRIEF DESCRIPTION OF THE DRAWING

FIG. 1 is an exploded side elevational view of the mounting arrangement according to the present invention, together with a floating-caliper spot-type disc brake arrangement cooperating therewith;

FIG. 2 is an axial end view of the mounting arrangement of the present invention taken in the direction of the arrow A of FIG. 1;

FIG. 3 is a top plan view of the mounting arrangement taken in the direction of the arrow B of FIG. 2;

FIG. 4 is an end view of one component of the mounting arrangement taken in the direction of arrow C in FIG. 3; and FIG. 5 is a view similar to that of FIG. 1 but without the disc brake and in the assembled condition.

BRIEF DESCRIPTION OF THE ACCOMPANYING DRAWING

Referring now to the drawing in detail, and first to FIG. 1 thereof, it may be seen that reference numeral 1 has been used to identify supporting strut, such as MacPherson strut of a front wheel suspension. A mounting arrangement, collectively identified by the reference numeral 2, is mounted on the supporting strut 1. The mounting arrangement 2 includes a cup-shaped first component 3 which is secured to the strut 1, preferably by being welded thereto, and second component 4 which is connected to the first component 3 in the assembled condition of the mounting arrangement 2 in any conventional manner, such as by screws or similar threaded fastening elements.

The mounting arrangement 2 serves for supporting a wheel axle 5 on the strut 1. A brake disc or rotor 6 is mounted on the wheel axle 5 for rotation therewith. The mounting arrangement also supports a floating-caliper spot-type disc brake 7. The disc brake 7 includes two brake shoes 8 and 9 which are arranged at mutually opposite axial sides of the brake rotor 6. The brake shoes 8 and 9 are supported and guided on supporting portions 10 and 11 of the second component 4. The supporting portions 10 and 11 are spaced from one another in the circumferential direction of the wheel axle 5.

The disc brake 7 further includes a caliper 12 which is also supported on the second component 4 in the assembled condition of the disc brake 7. As indicated in FIG. 1, the caliper 12 is mounted on the second component 4 by means of two mounting elements or guiding rods 13 and 14 that have respective threaded end portions 15 and 16 which are threaded into threaded bores 17 and 18 of the second component 4, respectively. The guiding rods 13 and 14 are received in corresponding bores 19 and 20 of the caliper 12 for sliding movement of the caliper 12 in the longitudinal direction of the guiding rods 13 and 14, which is parallel to the axial direction of the wheel axle 5. This parallelism is achieved in that the second component 4 has a sleeve-shaped portion 21 in which the wheel axle 5 is supported for rotation about its axis.

The caliper 12 is provided, at its right-hand end as viewed in FIG. 1, with an engaging portion 22 that is adapted to engage the brake shoe 9 in the assembled condition of the disc brake 7. At its other axial end, the caliper 12 is provided with a cylinder 23 which is rigid with, and preferably integral with, the remainder of the caliper 12. The cylinder 23 has an internal bore 24 in which there is accommodated for a sliding movement a brake actuating piston 25. The cylinder 23 has a control port 26 through which hydraulic fluid is admitted into the bore 24 and through which the pressure of the hydraulic fluid in the bore 24 is controlled in a conventional manner to thereby activate and de-activate the disc brake 7. In the assembled condition of the disc brake 7, the piston 25 is juxtposed with, and preferably connected to, the brake shoe 8, so that the pressure of the hydraulic fluid acting on the piston 25 will be transmitted to the latter. At the same time, the pressure of the hydraulic fluid will also act in the axial direction on an axial end wall 27 of the cylinder 23, but in an axial direction opposite to that in which the pressure of the hydraulic fluid acts on the piston 25. The resultant reaction force will be transmitted through the cylinder 23 and through a bridge portion 28 of the caliper 12 to the engaging portion 22 which will then act on the brake shoe 9. The bridge portion 28 spans the brake rotor 6, that is, it extends past the same radially outward of the brake rotor 6 from one to the other axial side thereof.

It will be appreciated that, as the pressure of the hydraulic fluid in the bore 24 increases, the piston 25 will displace the brake shoe 8 toward the brake rotor 6 until, eventually, the brake shoe 8, that is, lining 29 of the brake shoe 8, frictionally engages an annual portion 30 of the brake rotor 6 at one axial face thereof. Simultaneously, the action of the pressurized hydraulic fluid on the end wall 27 will cause the caliper 12 to slide on the guide rods 13 and 14, so that the engaging portion 22 will cause friction lining 31 of the brake shoe 9 to enter into frictional engagement with the other end face of the portion 30 of the brake rotor or disc 6, after displacing the brake shoe 9 toward the brake rotor 6.

To assure proper guidance of the caliper 12 on the guiding rods 13 and 14, the caliper 12 is provided with protuberances or lugs 32 and 33 which flank the cylinder 23 and which are provided with portions of the guiding bores 19 and 20. The guiding rods 13 and 14 can be guided in the guiding bores 19 and 20 either directly, or through the intermediary of respective elastic or rigid guiding sleeves or slide bearings. The first component 3 has an upset portion 34 which, in the assembled condition of the mounting arrangement 2, is received in the sleeve-shaped portion 21 of the second component 4 around the wheel axle 5.

It may be seen from the above description that the second component 4 is so constructed as to directly mount the constituent parts of the disc brake 7 on the first component 3 and thus on the strut 1. The support portions 10 and 11 serve to guide the brake shoes 8 and 9 for movement in the axial directions of the wheel axle 5, while the guiding rods 13 and 14, which are also mounted on the second component 4, serve to guide the caliper 12 for movement in opposite axial directions of the wheel axle 5. Moreover, the presence of the sleeve-shaped portion of the second component 4 and its cooperation with the upset portion 34 of the first component 3 of the mounting arrangement 2 serve to define a coaxial position of the wheel axle 5 relative to the first and second components 3 and 4 of the mounting arrangement 2 and thus relative to the support portions 10 and 11 and the guiding rods 13 and 14.

Turning now to FIG. 2 for further details of the mounting arrangement 2, it may be seen that the first component 3 bounds a channel 35 for receiving an end portion of the strut 1. The end portion of the strut 1 is secured in the channel 35 in any known manner, preferably by being welded therein. The cup-shaped first component 3 further bounds a recess 36 which, in the assembled condition of the mounting arrangement 5, receives a shaft seal surrounding the wheel axle 5. Hence, the first component 3 protects such shaft seal from excessive soiling or damage by flying objects such as pebbles lifted off the roadway. A socket arrangement 37 is affixed to the first component 3 and is accommodated in the recess 36 of the latter. The socket arrangement 37 constitutes a part of a universal joint for connecting a suspension link to the first component 3 and thus to the strut 1.

The cup-shaped first component 3 of the mounting arrangement 2 further includes a flange 38 which extends all around the recess 36 and serves to increase the rigidity of the cup-shaped first component 3. The first component 3 and, for that matter, also the second component 4, are preferably made of sheet metal in respective stamping or pressing operations. In this manner, the cost of the mounting arrangement 2 is kept to a minimum. Yet, owing to the construction and configuration of the components 3 and 4, they are capable of withstanding and/or transmitting the quite substantial forces acting thereon during the use of the mounting arrangement. FIG. 2 also shows three holes 39 accommodating respective threaded elements 40 which connect the first and second components 3 and 4 to one another.

FIG. 4 of the drawing illustrates additional details of the mounting arrangement 2 of the present invention in its assembled condition. So, for instance, it may be seen that the second component 4 is provided with an extension or attachment portion 41 which extends substantially normal to the axis of the channel 35 and which serves for attachment of a steering lever or link thereto. To this end, the attachment portion 41 is provided with a bore 42 to which the steering link is connected. Hence, the second component 4 also serves for transmitting the steering forces to the wheel axle 5 and thus to the wheel being steered. As a result of this, it is no longer necessary to provide a separate attachment portion on the strut 1, as is currently customary in the automobile manufacturing industry.

FIG. 3 also shows that the sleeve-shaped portion 21 of the second component 4 bounds an internal passage 43 into which the upset portion 34 of the first component 3 extends and through which the wheel axle 5 passes in the assembled condition of the mounting arrangement 2 with the wheel axle 5. The passage 43 further accommodates a bearing 44, preferably a ball or roller bearing assembly which may be of the pre-adjusted or adjustable type. As illustrated in FIG. 3, the bearing 44 may be confined between the upset portion 34 and a split locking ring 45 which is received in an annular groove 46 of the sleeve-shaped portion 21.

The second component 4 of the mounting arrangement 2 is shown by itself in FIG. 4. It may be seen here that the second component 4 is provided with three through bores 47 which are aligned, in the assembled condition of the arrangement 2 with the bores 39 of the first component 3 and which accommodate the threaded fastening elements 40. It may also be seen in FIG. 4 that the attachment portion 41 is arranged at the opposite side of the sleeve-shaped portion 21 from the region of the second component 4 at which the disc brake 7 is mounted. A substantially circular cutout 48 is provided at the latter region intermediate at the bores 17 and 18. This cutout 48 serves for the passage of the piston 25 therethrough in the assembled condition of the mounting arrangement 2 with the axial 5 and with the disc brake 7. A deformed portion 49 of the second component 4 increases the strength of the second component 4 at the region of the bore 18, whereas a flange 50, also shown in FIG. 2, increases the rigidity of the second component at the region of the attachment portion or arm 41, and therebetween. It is also indicated in FIG. 4 that the second component 4 may be deformed around the sleeve-shaped portion 21 in conformity with the first component 3, to achieve nesting and thus convenient relative position predetermination. This nesting may also be perceived from FIG. 5.

FIG. 5 also indicates a different way of confining the bearing 44. In this construction, the bearing 44 still rests against the upset portion 34 of the first component 3. However, it is indicated here that the wheel axle 5 has an enlarged-diameter portion 51 which forms a shoulder 52 against which the bearing 44 abuts. This arrangement renders it possible to dispense with the separate locking ring 45 in the passage 43.

As also illustrated in FIG. 5, a strap or a similar reinforcing element 53 may be provided. This strap 53 extends between the support portions 10 and 11 and is secured thereto, such as by welding. Thus, the strap 53 will transmit forces between the support portions 10 and 11 and thus prevent excessive bending of that one of the cantilevered support portions 10 or 11 to which the brake shoes 8 and 9 apply forces during the braking operation.

While we have described above the principles of our invention in connection with specific apparatus, it is to be clearly understood that this description is made only by way of example and not as a limitation to the scope of our invention as set forth in the objects thereof and in the accompanying claims.

We claim:

1. An arrangement for mounting on a supporting strut a rotatable vehicle wheel axle and a disc brake assembly including a pair of brake shoes one arranged at one and the other at the other axial side of a brake rotor jointly rotatable with the wheel axle, a brake caliper spanning the brake rotor, and an actuating unit connected to the brake caliper at the one axial side and acting directly on the one and through the brake caliper on the other brake shoe, comprising
   a first component of a substantially cup-shaped configuration connected to the strut and having a through opening for the passage of the wheel axle therethrough and an axially facing outer surface surrounding said through opening; and
   a second component having a contact surface and so connected to said first component that said contact surface contacts said outer surface,
   said second component including
     a sleeve-shaped portion extending away from said first component and bounding a passage aligned with said through opening for accommodating the wheel axle,
     at least one bearing received in said passage and supporting the wheel axle therein,
     a pair of brake shoe supporting arms extending away from, said first component outwardly spaced from said sleeve-shaped portion and circumferentially spaced from one another and having respective guiding surfaces for the brake shoes extending substantially parallel to said passage, and
     a pair of caliper-mounting portions spaced outwardly from said sleeve-shaped portion and circumferentially from one another for mounting the brake caliper thereon for movement substantially parallel to the wheel axle.

2. The arrangement as defined in claim 1, wherein at least said first component is a sheet metal pressing.

3. The arrangement as defined in claim 1, wherein said second component is a sheet metal pressing.

4. The arrangement as defined in claim 1, wherein said first component has a zone bounding a channel for receiving a portion of the strut; and further comprising welded connection means for connecting said first component to the strut at said zone.

5. The arrangement as defined in claim 1, wherein the axis of said passage extends transversely of the strut axis.

6. The arrangement as defined in claim 5, wherein the strut is turnable about the strut axis; and wherein said second component further includes an attachment portion for attachment of a steering arm thereto.

7. The arrangement as defined in claim 6, wherein said attachment portion extends substantially along a plane normal to the strut axis in assembled condition of the arrangement.

8. The arrangement as defined in claim 1, wherein said first component has an upset portion bounding said through opening and extending into said passage of said second component.

9. A brakable wheel axle arrangement for a vehicle, comprising
   a supporting strut mounted on the vehicle and having a free end portion;
   a first mounting component of a substantially cup-shaped configuration connected to said free end portion of said strut and having a through opening and an external surface surrounding said through opening;
   a second mounting component having a contact surface and so connected to said first mounting component that said contact surface contacts said external surface, including
     a sleeve-shaped portion extending away from said first mounting component and bounding a passage aligned with said through opening;
     a pair of supporting arms extending away from said first mounting component outwardly spaced from said sleeve-shaped portion and circumferentially spaced from one another to delimit a receiving space with one another and with said sleeve-shaped portion and having respective guiding surfaces extending substantially parallel to said passage, and
     a pair of mounting portions spaced outwardly from said sleeve-shaped portion and circumferentially from one another;
   at least one bearing received in said passage;
   a wheel axle rotatably supported on said bearing;
   a brake rotor mounted on said wheel axle for joint rotation therewith and having a radially extending annular portion passing through said receiving space during the rotation of said brake rotor;
   a pair of brake shoes guided on said guiding surfaces of said supporting arms of said second ounting component at opposite axial sides of said annular portion of said brake rotor for movement toward and away from braking engagement with said radially extending portion;

a brake caliper including an actuating cylinder portion bounding a chamber;

an actuating piston sealingly and slidingly received in said chamber; and means for so mounting said brake caliper on said mounting portions of said second mounting member for movement substantially parallel to said wheel axle that said caliper spans said annular portion of said brake rotor to engage that of said brake shoes which is situated at the opposite axial side of said radially extending portion from said mounting components and that said actuating piston engages the brake shoe which is situated at the same axial side as said mounting components.

10. The arrangement as defined in claim 9, wherein at least said first mounting component is a sheet metal pressing.

11. The arrangement as defined in claim 9, wherein said second mounting component is a sheet metal pressing.

12. The arrangement as defined in claim 9, wherein said first mounting component has a zone bounding a channel for receiving said free end portion of said strut; and further comprising welded connecting means for connecting said first mounting component to said strut at said zone.

13. The arrangement as defined in claim 9, wherein said free end portion of said strut is centered on a strut axis extending transversely of the axis of said wheel axle.

14. The arrangement as defined in claim 13, wherein at least said free end portion of said strut is turnable about said strut axis; wherein said second mounting component further includes an attachment portion; and further comprising a steering arm attached to said attachment portion of said second mounting component.

15. The arrangement as defined in claim 14, wherein said attachment portion extends substantially along a plane normal to said strut axis.

16. The arrangement as defined in claim 9, and further comprising a clamping device for a suspension, secured within said cup-shaped first mounting component.

17. The arrangement as defined in claim 9, wherein said mounting means for said brake caliper includes means for bounding threaded bores in said mounting portions of said second mounting component, a pair of elongated guiding elements having threaded portions threaded into said threaded bores of said mounting portions of said second mounting component and extending therefrom outwardly past said first mounting component, and means delimiting guiding bores in said brake caliper which slidingly receive said guiding elements.

18. The arrangement as defined in claim 9, wherein said first mounting component has an upset portion bounding said through opening and extending into said passage of said sleeve-shaped portion of said second mounting component.

19. The arrangement as defined in claim 9, and further comprising a reinforcing element extending between and rigidly connected to said supporting arms.

20. The arrangement as defined in claim 19, wherein said supporting arms have free end portions remote from said first mounting component; and wherein said reinforcing element is connected to said free end portions of said supporting arms.

* * * * *